United States Patent [19]

Jaswa

[11] Patent Number: 4,581,698
[45] Date of Patent: Apr. 8, 1986

[54] METHOD AND SYSTEM FOR GENERATING INTERPOLATION PULSES

[75] Inventor: Vijay C. Jaswa, Clifton Park, N.Y.

[73] Assignee: General Electric Company, Schenectady, N.Y.

[21] Appl. No.: 631,358

[22] Filed: Jul. 16, 1984

Related U.S. Application Data

[63] Continuation of Ser. No. 322,356, Nov. 18, 1981, abandoned.

[51] Int. Cl.$^4$ ............................................. G05B 19/41
[52] U.S. Cl. ..................................... 364/169; 318/571; 318/573; 364/723
[58] Field of Search ............... 364/200, 900, 718, 183, 364/300 LP, 169, 170, 723, 853, 474; 318/570, 571, 573

[56] References Cited

U.S. PATENT DOCUMENTS

| | | | |
|---|---|---|---|
| 3,763,363 | 10/1973 | Saita et al. | 235/152 |
| 3,882,304 | 5/1975 | Walters | 364/300 |
| 4,310,878 | 1/1982 | Hyatt | 364/183 |
| 4,493,032 | 1/1985 | Johnson | 364/169 |

Primary Examiner—Gareth D. Shaw
Assistant Examiner—Jonathan C. Fairbanks
Attorney, Agent, or Firm—Donald R. Campbell; James C. Davis, Jr.; Paul R. Webb, II

[57] ABSTRACT

A technique of determining the distribution of pulses along two perpendicular X-Y axes of a numerically controlled machine can be used for linear, circular, and parabolic interpolations and may be extended to computer graphics. At the initial point on the curve and at each succeeding point, a decision is made to increment the X axis, the Y axis, or both axes. This decision is based on a deviation index which is an index of closeness to the desired curve. Hardware is minimized and involves only additions, compares, shifts, and increments/decrements.

9 Claims, 6 Drawing Figures

METHOD AND SYSTEM FOR GENERATING INTERPOLATION PULSES

This application is a continuation of application Ser. No. 322,356, filed Nov. 18, 1981 now abandoned.

BACKGROUND OF THE INVENTION

This invention relates to determining the distribution of interpolation pulses to the axes of a numerically controlled machine tool and other apparatus such as computer graphics devices.

A simple and accurate approach to controlling the feedrate on numerical control is desired. The accuracy required (for instance on the order of 32 bits) and the time available to do the calculation (for instance, 20 microseconds) are such that there is no time to perform conventional arithmetic with multiplications and divisions to do the interpolation function. For linear interpolations the information available consists of the coordinates of the starting and end points. From this information, the pulse rates to the individual axes must be derived such that the axes coordinates change in a linear fashion up to the desired end point. For circular interpolation, the information available consists of the arc center offset and the direction of motion. For both types of interpolation, a single output pulse to the axes corresponds to a unit of incremental motion along the axes.

The four known approaches used to date are the DDA (digital differential analyzer), the MIT approach, the Saita Function generator, and the algebraic solution approach. Of these, the first two evolved from the extension of the equivalent of analog integrators to the DDA in the solution of differential equations that describe the curve. The accuracy of the DDA and MIT approaches is dependent on the coordinate locations. Further, the circle-generating DDA in reality generates a spiral instead of a circle, thus creating the problem of "completing the arc" by artificially injecting a few pulses in the direction of the incomplete axis. This generates a "flat" surface at the end of the arc. The Saita Function generator method separates the X and Y functions by introducing a third variable T, and expressing the now independent X,Y variables as arithmetic progressions of T. The algebraic computation method is inefficient in terms of hardware, expense, and the time required to solve the differential equation.

SUMMARY OF THE INVENTION

The distribution of interpolation pulses to the X and Y axes of a numerically controlled machine, to obtain motion by increments that approximates a curve, is determined by making a decision at the initial point and each succeeding point as to whether to increment the X axis, the Y axis, or both the X and Y axes. A deviation index is defined which is a function of an invariant parameter of the curve, such as the slope of a straight line and the radius of a circular arc. This index is an index of closeness to the desired curve and is kept as close to zero as possible, and guarantees that the approximate curve is typically no more than one incremental unit from the desired curve.

Input pulses having move and feedrate information are supplied to an interpolation unit. At each step or incremental move the values of three new deviation indices are determined, when only the X-axis is incremented, only the Y axis is incremented, or both axes are simultaneously incremented. The new indices are compared; the index with the smallest absolute value is selected and an interpolation pulse is applied to the corresponding axis or to both axes. The smallest index is fed back and is the deviation index for the next step. For the linear interpolation problem, three additions and three compares are needed at each step; circular interpolation involves two shifts and increments/decrements, four adds and three compares. A correction to keep the actual feedrate equal to to the commanded feedrate is made by adding $\sqrt{2}-1$ to a running total and skipping a pulse at appropriate times.

The decision process is simplified yielding economical hardware by the incremental nature of the problem. The linear interpolator, for instance, has three adders, a comparator, and a control multiplexer. The technique may also be used for parabolic interpolations, and may be extended from numerical control to computer graphics.

DESCRIPTION OF THE PREFERRED EMBODIMENTS

Figure 1:
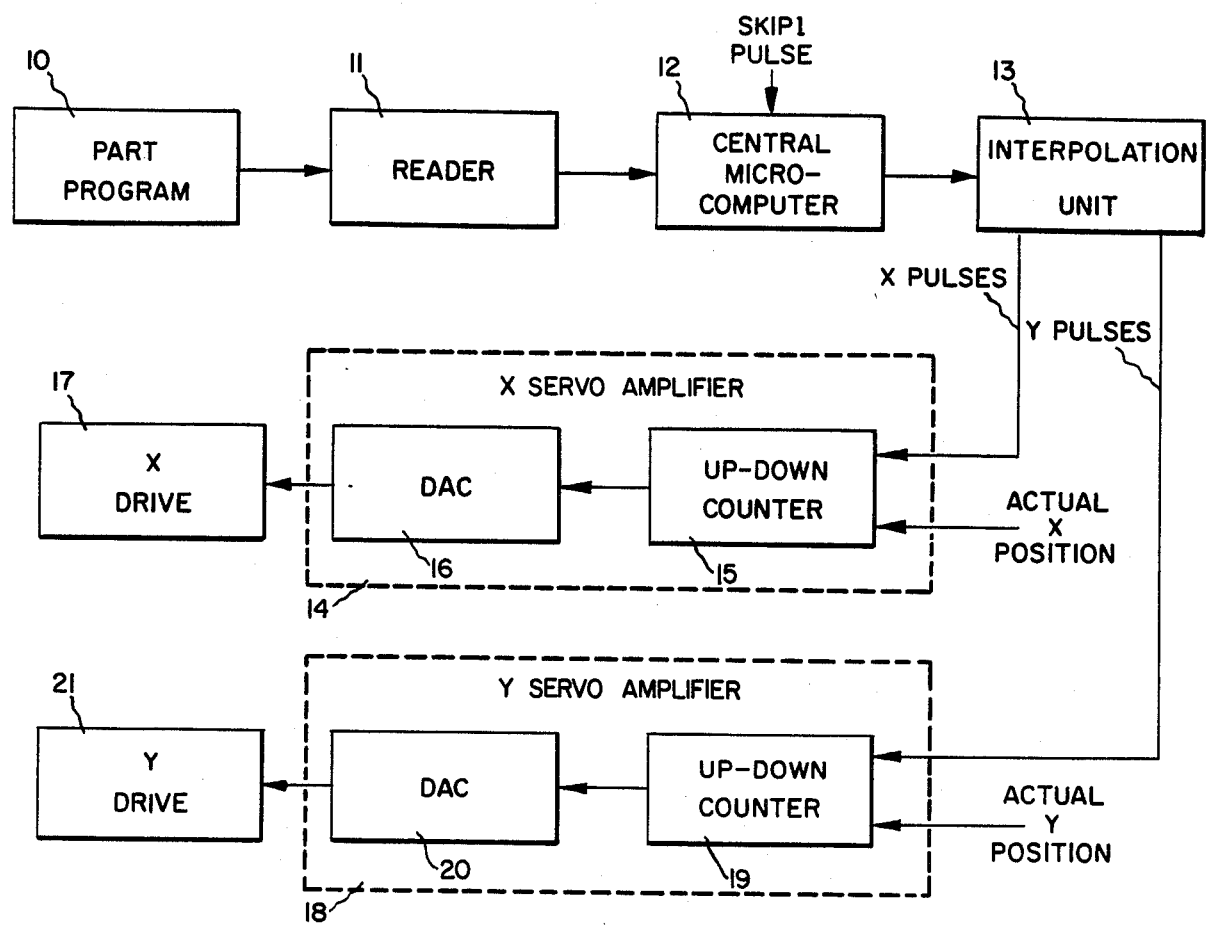
FIG. 1 is a simplified block diagram of a machine tool numerical control system.

A typical numerical control system for a numerically controlled machine tool is shown in FIG. 1. A part program 10 such as a punched paper tape has coded command instructions on the major moves to be made by the tool in order to machine a part which has the desired shape. If a straight line move is made, the part program gives the starting and end points and the rate of travel (feedrate). A reader 11 converts the coded instructions into electrical signals which are fed to a central microcomputer 12, where major moves may be broken up into smaller moves. The input pulses to an interpolation unit 13 have this smaller move information and are clocked in from the microcomputer at a pulse rate which is proportional to the commanded vectorial feedrate; the maximum rate is 50 KHz. For every input pulse there is one X output pulse, or one Y output pulse, or one output pulse on both axes simultaneously. The first-mentioned pulses are passed to a X servo amplifier 14 which is comprised of an up-down counter 15 and a digital-to-analog converter 16. The interpolation pulses are fed to the up input and feedback from the X axis, the actual X position, is presented to the down input. The X drive 17 energized by the servo amplifier is typically a DC motor. The Y interpolation pulses and information on the actual Y position are fed to the Y servo amplifier 18 and the up-counter 19. The output count is converted to an analog voltage by DAC 20 and is fed to the Y drive 21.

When a curve described by a two-dimensional function, such as a straight line and a circular arc, is to be drawn between two end points of the curve, and a pulse rate is available that is proportional to the desired vectorial feedrate, then it is a feature of the invention to put out pulses to the individual axes for each input pulse in an appropriate fashion. Each output pulse to the individual axis causes incremental motion, so that the output pulse rates determine the shape of the curve. Thus, for each input pulse, a decision must be made whether the incremental motion must take place in the X-direction, the Y-direction, or in the X and Y directions. A decision is made if, for each input pulse, the output pulse is distributed to the X-axis, the Y-axis, or one to both the X and Y axes. The decision is based upon the value of an index, denoted the index of closeness or deviation index, which indicates how close the decision will take one to the desired curve. Having made the choice, the corresponding move is made and the index updated to reflect the new deviation from the desired curve. The deviation index is in fact the value of the function F, where $F(x,y)=0$ is a curve that the axes must describe. The procedure will become clear from the following description of linear and circular interpolation.

Figure 2:
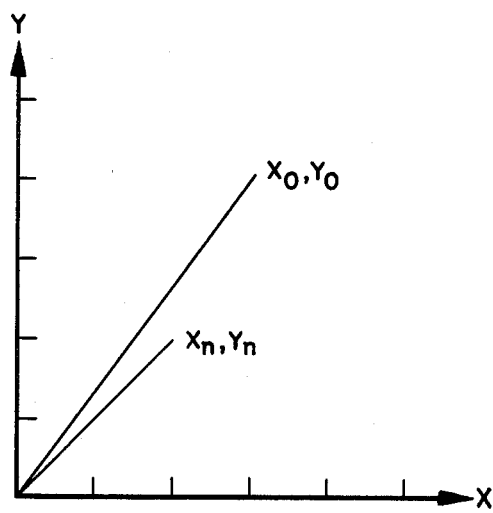
FIG. 2 is used to explain derivation of the deviation index in linear interpolation.

An invariant parameter of the curve is identified, and a deviation index is defined which is a function of this invariant. The index is kept as close to zero as possible. In the case of linear interpolation, the invariant (see FIG. 2) is the slope of the line joining the origin and the end point $X_o$, $Y_o$. The coordinates after the $n^{th}$ step are $X_n$, $Y_n$.

$$Y_o/X_o = \text{desired slope} \qquad (1)$$

$$Y_n/X_n = \text{actual slope} \qquad (2)$$

If the desired slope equals the actual slope, $$(Y_o/X_o)-(Y_n/X_n)=0 \qquad (3)$$

$$X_n Y_o - X_o Y_n = 0 \qquad (4)$$

Equation (4) is the deviation index, $\Delta$, for linear interpolation.

Figure 3:
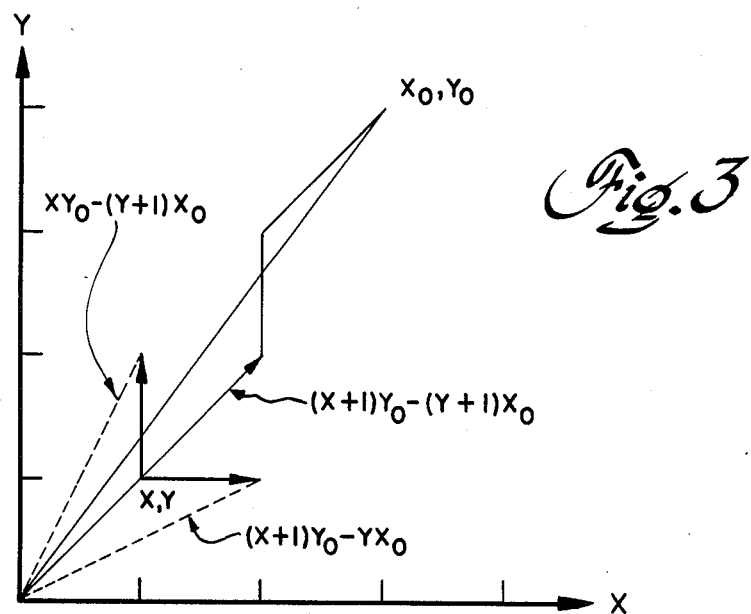
FIG. 3 shows linear interpolation and the moves to go from the origin to $X_o$, $Y_o$, and the three moves that are possible at the given point X, Y.

FIG. 3 shows the moves that are possible at a given point X, Y assuming that linear interpolation from the origin to the point $X_o$, $Y_o$ is desired. The equation for the required straight line is as in (4).

If X alone were incremented the new index would be, $$(X_n+1)Y_o - Y_n X_o = \Delta_{n+1,x} \qquad (5)$$

Similarly, if only Y were incremented the new index would be, $$X_n Y_o - (Y_n+1)X_o = \Delta_{n+1,y} \qquad (6)$$

and if X and Y were both incremented the new index would be $$(X_n+1)Y_o - (Y_n+1)X_o = \Delta_{n+1,xy} \qquad (7)$$

The new indices are called the x index, y index and xy index. Equations (5), (6), and (7) could be written as $$X_n Y_o - Y_n X_o + Y_o = \Delta_{n+1,x} \qquad (8)$$

$$X_n Y_o - Y_n X_o - X_o = \Delta_{n+1,y} \qquad (9)$$

$$X_n Y_o - Y_n X_o + Y_o - X_o = \Delta_{n+1,xy} \qquad (10)$$

The term $X_n Y_o - Y_n X_o$ is recognized as the deviation index from the previous iteration. Hence the new index is simply the old index plus or minus a constant. The decision as to which axis to increment therefore depends on which of equations (8), (9), and (10) minimizes the new index. Thus for the linear interpolation problem, three additions and three compares are required at each step.

Table I shows the steps required to "draw" a straight line from the origin to point 3, 4 in the X-Y plane. This should be looked at in conjunction with FIG. 3, which shows the three possible moves at point 1, 1.

TABLE I

| Step | $\Delta$ (Div. Index) | $Y_o$ | $\Delta_{n+1,x}$ | $-X_o$ | $\Delta_{n+1,y}$ | $Y_o-X_o$ | $\Delta_{n+1,xy}$ | X | Y |
|---|---|---|---|---|---|---|---|---|---|
| 1 | 0 | 4 | 4 | −3 | −3 | 1 | 1 | 1 | 1 |
| 2 | 1 | 4 | 5 | −3 | −2 | 1 | 2 | 2 | 2 |
| 3 | 2 | 4 | 6 | −3 | −1 | 1 | 4 | 2 | 3 |
| 4 | −1 | 4 | 3 | −3 | −4 | 1 | 0 | 3 | 4 |

The x index, y index, and xy index are calculated from equations (8), (9), and (10) and the third is the smallest; the decision is to send an interpolation pulse to both the X and Y axes and to move to point 1, 1. The xy index is the new index, $\Delta$, for the second step. Here both the y index and xy index are the same but of opposite sign (−2 and 2) and the second is chosen arbitrarily; the move is to point 2, 2. On the third step the y index (−1) is smallest and the move is to point 2, 3. On the fourth step the xy index (0) is smallest and the final move is to end point 3, 4.

Figure 4:
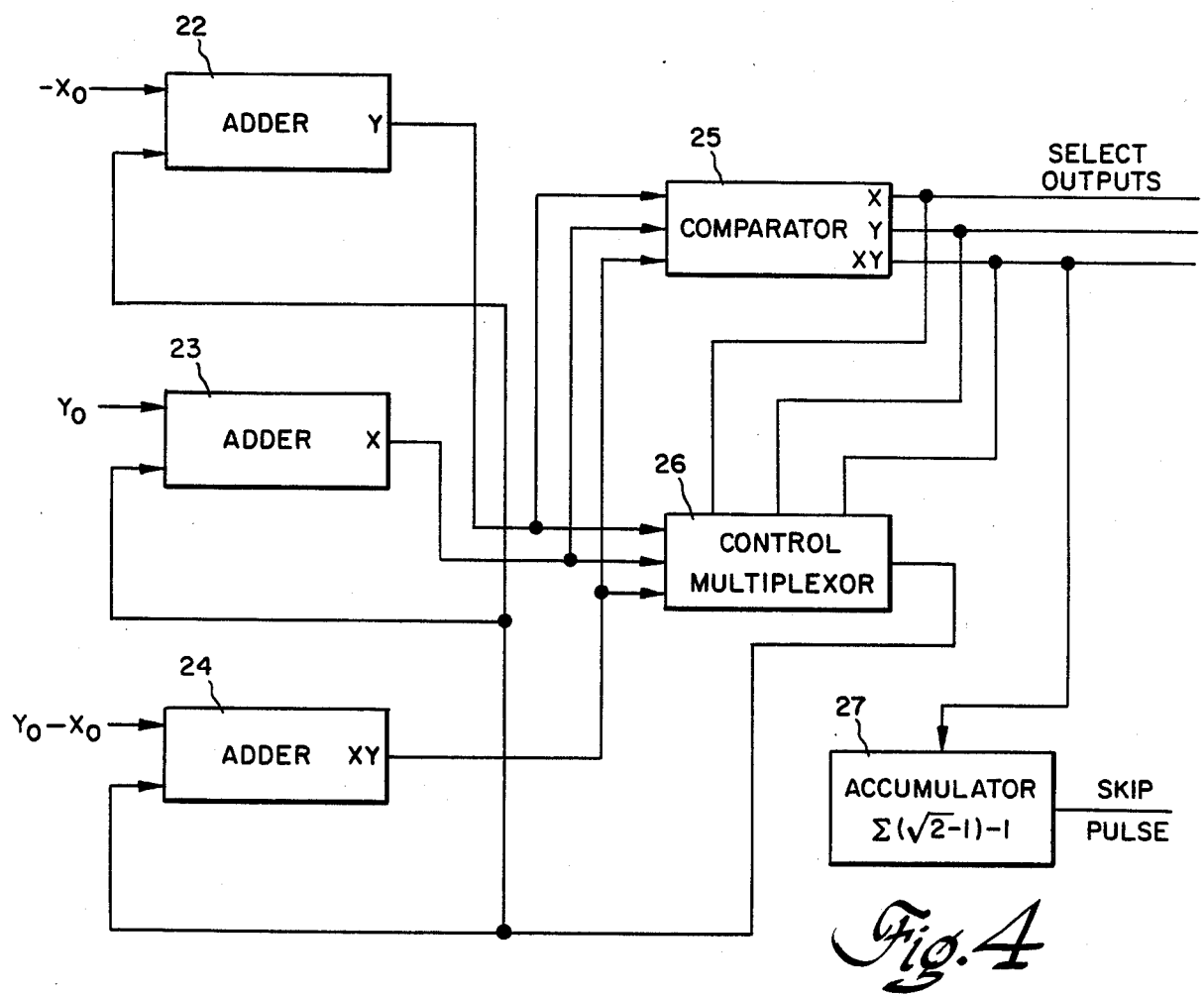
FIG. 4 is a block diagram of a linear interpolation circuit.

FIG. 4 illustrates one embodiment of a hardware linear interpolation circuit. It is comprised of three adders 22, 23, and 24 to which move instruction data is supplied, a three-input comparator 25, and a control multiplexer 26. All three adders are zeroed before the move begins. The first adder 22 sums $-X_o$ and the deviation index, $\Delta$, and produces at its output the new y deviation index which is fed to both the comparator 25 and control multiplexer 26. The second adder 23 sums $Y_o$ and the deviation index and produces the new x index, and the third adder 24 adds $Y_o-X_o$ and the deviation index and produces a new xy index. Comparator 25 determines the smallest of the three new deviation indices and selects an output; a X axis interpolation pulse, a Y axis interpolation pulse, or one interpolation pulse on both axes is generated and sent to the servo amplifiers. Control multiplexer 26 is connected to the adder outputs and to the three output lines of comparator 25. The x index, y index, and xy index are stored and one of the three, depending on the comparator decision, is gated to the multiplexer output and hence to the adders 22-24. This is the deviation index, $\Delta$, for the next step and is in turn added to $-X_o$, $Y_o$, and $Y_o-X_o$ when this data is clocked in.

This invention provides a precise, inexpensive and computationally simple scheme to generate lines (and other curves) for numerical control machines. Multiplications and divisions to do the interpolation function, which take more time to perform than is available, are not involved. This technique guarantees that the approximate curve is never more than one incremental unit from the desired curve and a tolerance of one unit increment is achieved. The decision process is simplified thereby yielding economical hardware by the incremental nature of the problem. Another feature is that feedrate control is achieved so that the rate at which the tool moves over the workpiece is proportional to the commanded feedrate.

While the DDA approach guarantees that tangential feedrate is maintained exactly, the incremental technique does not guarantee it. Whenever the X and Y axes are simultaneously incremented, the velocity is exceeded by a factor $\sqrt{2}$. Thus, in order to obtain the correct feedrate, it is necessary to maintain a running total to which $\sqrt{2}-1$ is added every time both axes are simultaneously incremented. Whenever the total exceeds 1, 1 is subtracted from this total and on the following input pulse, no output pulse is fed to either of the two axes, and the input pulse is ignored. Thus a correction is made for the desired feedrate. Accumulator 27 is connected to the X, Y output line of comparator 25 and generates commands to skip or defeat one input pulse which are sent to central microcomputer 12, FIG. 1. The sum in the accumulator will be 0.414, 0.828, and 1.242. At this time, 1 subtracted from the total and a skip input pulse command is issued. The sum is then 0.242, 0.656, and so on.

Figure 5:
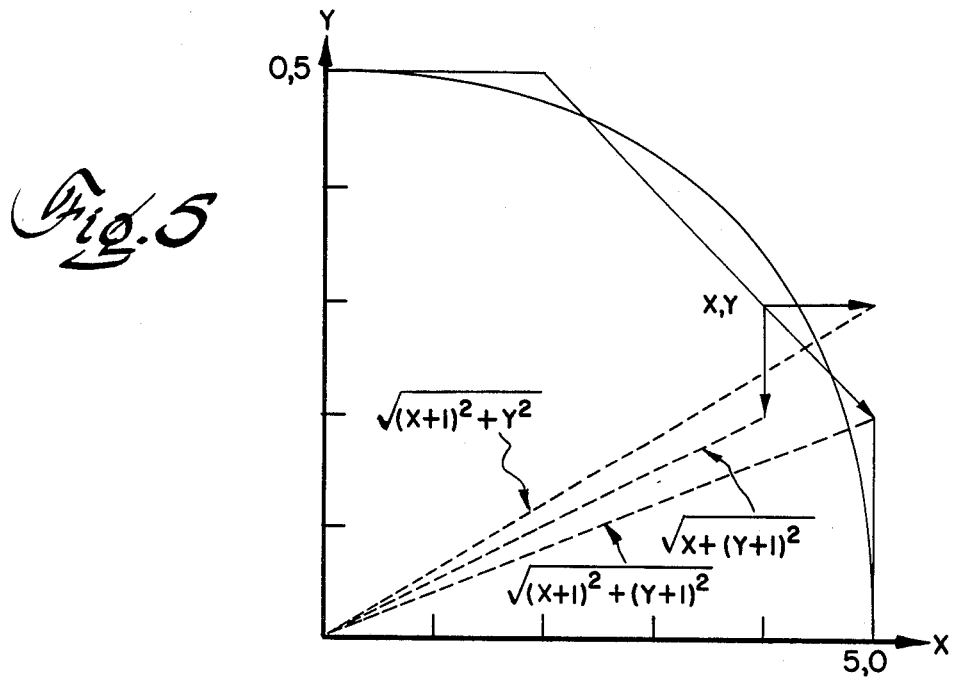
FIG. 5 shows circular interpolation and the moves to go from starting point 0, 5 to end point 5, 0, and the three moves that are possible at the given point X, Y.

For circular interpolation, the part program specifies the starting and end points, the coordinates of the center, and the feedrate. The invariant parameter of this curve is the radius, and the deviation index therefore is a function of the radius. Only a few more calculations are required. In FIG. 5, an arc is to be drawn in the first quadrant in the clockwise direction. The coordinates after the $n^{th}$ step are $X_n$, $Y_n$; at this point $X_n^2 + Y_n^2 = R_o^2$. Then $$X_n^2 + Y_n^2 - R_o^2 = 0 \tag{11}$$

This is the deviation index, $\Delta$. Here the new deviation indices after incremental movements are, $$(X_n+1)^2 + Y_n^2 - R_o^2 = \Delta_{n+1,x} \tag{12}$$

$$X_n^2 + (Y_n-1)^2 - R_o^2 = \Delta_{n+1,y} \tag{13}$$

$$(X_n+1)^2 + (Y_n-1)^2 - R_o^2 = \Delta_{n+1,xy} \tag{14}$$

These can be rewritten as, $$X_n^2 + Y_n^2 - R_o^2 + 2X_n + 1 = \Delta_{n+1,x} \tag{15}$$

$$X_n^2 + Y_n^2 - R_o^2 - 2Y_n + 1 = \Delta_{n+1,y} \tag{16}$$

$$X_n^2 + Y_n^2 - R_o^2 + 2X_n - 2Y_n + 2 = \Delta_{n+1,xy} \tag{17}$$

The term $X_n^2 + Y_n^2 - R_o^2 = 0$ is recognized as the value of the deviation index, $\Delta$, from the previous iteration. Hence, if X is incremented, the change in index is $2X+1$, if Y is incremented the change is $-2Y+1$, and if X is incremented and Y is decremented the change is $2X-2Y+2$. Hence each decision step involves two shift and increments (decrements), four adds and three compares. In digital logic multiplication by 2 is accomplished by a left shift. Table II shows the steps required to trace an arc from 0, 5 to 5, 0; it should be looked at together with FIG. 5.

TABLE II

| Step | Δ (Div. Index) | 2X + 1 | $\Delta_{n+1,x}$ | −2Y + 1 | $\Delta_{n+1,y}$ | 2X−2Y + 2 | $\Delta_{n+1,xy}$ | X | Y |
|---|---|---|---|---|---|---|---|---|---|
| 1 | 0 | 1 | 1 | −9 | −9 | −8 | 8 | 1 | 5 |
| 2 | 1 | 3 | 4 | −9 | −8 | −6 | −5 | 2 | 5 |
| 3 | 4 | 5 | 9 | −9 | −5 | −4 | 0 | 3 | 4 |
| 4 | 0 | 7 | 7 | −7 | −7 | 0 | 0 | 4 | 3 |
| 5 | 0 | 9 | 9 | −5 | −5 | 4 | 4 | 5 | 2 |
| 6 | 4 | 11 | 15 | −3 | −1 | 8 | 12 | 5 | 1 |
| 7 | 1 | 11 | 12 | −1 | 0 | 10 | 11 | 5 | 0 |

Initially, $\Delta=0$, $X=0$, $Y=5$. For the first step the x index is the smallest and the move is to point 1, 5. Thus the new deviation index is 1, and $X=1$, $Y=5$ are used to calculate $2X+1$, etc. The remainder of the table should be clear.

Figure 6:
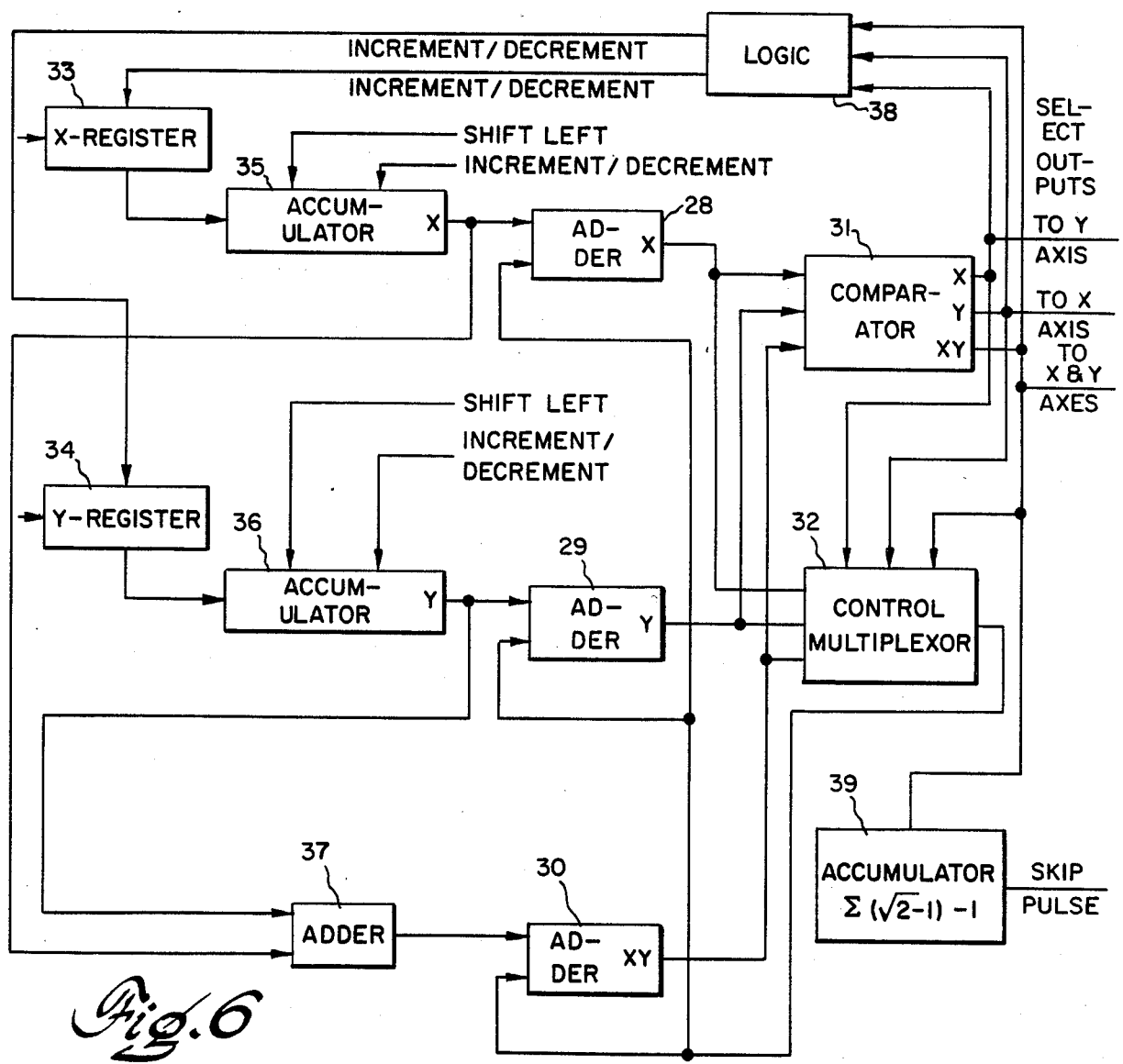
FIG. 6 is a block diagram of a circular interpolation circuit.

FIG. 6 illustrates the circular interpolation circuit in simplified block diagram form. The three adders 28, 29, and 30, comparator 31, and control multiplexer 32 are interconnected the same as in the linear interpolation circuit. Move instruction data is read out of the central microcomputer 12 into an X register 33 and a Y register 34. The coordinates between the starting and end points are stored in these registers. The X coordinate for the step is fed into an accumulator 35 which has shift left and increment/decrement inputs. The first multiplies the X coordinate by 2 and the second adds or subtracts 1 depending upon the quadrant and direction of movement. For the example given, the sum $2X+1$ and the deviation index are presented to adder 28; the x index at the output is passed to comparator 31 and control multiplexer 32. Accumulator 36 accepts the Y coordinate and generates the sum $-2Y+1$. This is added to the current deviation index in adder 29 and the y index is sent to the comparator and control multiplexer. The outputs of accumulators 35 and 36 are fed to adder 37 which produces the sum $2X-2Y+2$; this is added to the deviation index in adder 30, and the xy index is passed to the comparator and control multiplexer. Comparator 31 determines the smallest index and sends an interpolation pulse to the X axis, Y axis, or both axes. The selected comparator output is fed to control multiplexer 32 which gates the numerical value of the smallest index to adders 28-30, this being the deviation index for the next step.

Registers 33 and 34 are updated after every step of the move and provide the new X and Y coordinates to accumulators 35 and 36. The comparator output lines are connected to logic 38 which sends a signal to the X register, the Y register, or to both registers, and an indication to increment or decrement. Thus, the registers are shifted by one unit after the step or remain the same; depending on the comparator decision. Since X and Y change as the steps are made, the sums generated by accumulators 35 and 36 and adder 37 are usually different as is shown in Table II. Accumulator 39 sends skip input pulse commands to the central microcomputer the same as in FIG. 4 in order to obtain the correct feedrate.

The technique and system can also be used for parabolic interpolations, which requires fewer calculations than circular interpolation. The invariant parameter is that all points are equidistant from the directrix and focus. The deviation index, $\Delta$, is, $$Y - AX^2 = 0 \tag{18}$$

The following equations may be used to compute the increments to the deviation index.

$$Y_n - A(X_n+1)^2 = Y_n - AX_n^2 - 2AX_n - A = \Delta_{n+1,x} \tag{19}$$

$$Y_n + 1 - AX_n^2 = Y_n - AX_n^2 + 1 = \Delta_{n+1,y} \tag{20}$$

$$Y_n + 1 - A(X_n+1)^2 = Y_n - AX_n^2 - 2AX_n - A + 1 = \Delta_{n+1,xy} \tag{21}$$

The computation of the term 2AX arising from the increment along the X axis seems to imply multiplication by a constant. Since this can be time consuming, the multiplication can be circumvented by maintaining a running sum to which 2A is added every time X is incremented. The decision making process is similar to the linear and circular interpolation cases.

If after taking as many steps as are necessary the move is to a different point than the desired end point, extra interrogation pulses are generated to get to the end point. The method and system can be extended from numerical control (NC) to computer graphics as well. The interpolation unit supplies pulses which increment the X and Y drive voltage of the cathode ray tube. Move instruction data is entered by the user into an intelligent terminal which is a microcomputer. This tells the interpolation unit to draw a straight line or a circular arc, and gives the starting and end point coordinates and other data as may be needed.

While the invention has been particularly shown and described with reference to preferred embodiments thereof, it will be understood by those skilled in the art that the foregoing and other changes in form and details may be made therein without departing from the spirit and scope of the invention.

The invention claimed is:

1. A method of distributing interpolation pulses to the perpendicular X and Y axes of a numerically controlled machine to realize motion at approximately a commanded feedrate and by a series of incremental moves that approximate a curve, comprising:

supplying input pulses to an interpolation unit at a rate proportional to the commanded feedrate, said input pulses having move instruction data including the shape of the curve and starting and end point coordinates;

determining for each input pulse and at every incremental move, from said move data and a known deviation index, the value of new x, y and xy deviation indices resulting when only the X axis is incremented one unit, only the Y axis is incremented one unit, or both axes are simultaneously incremented one unit, where said deviation index is a function of an invariant parameter of said curve and is held as close to zero as possible;

comparing said new deviation indices and selecting the index with the smallest absolute value;

applying one interpolation pulse to an X axis drive when the new x index is smallest, to a Y axis drive when the new y index is smallest, and to both axis drives when the new xy index is smallest;

feeding back said smallest index which is the known deviation index for the next incremental move in the series; and keeping a running total every time both axes are simultaneously incremented and the commanded feedrate is exceeded, and selectively skipping one input pulse to make a feedrate correction.

2. The method of claim 1 wherein linear interpolation is performed and said deviation index is a function of the slope of a straight line and is $$X_n Y_o - X_o Y_n = 0,$$

where $X_o$ and $Y_o$ are the end point coordinates, and $X_n$ and $Y_n$ are the coordinates after the $n^{th}$ incremental move.

3. The method of claim 2 wherein said new x, y and xy deviation indices are determined by adding said known deviation index and, respectively, $Y_o$, $-X_o$, and $(Y_o - X_o)$.

4. The method of claim 1 wherein circular interpolation is performed and said deviation index is a function of the radius of a circular arc and is $$X_n^2 + Y_n^2 - R_o^2 = 0,$$

where $X_n$ and $Y_n$ are the coordinates after the $n^{th}$ incremental move and $R_o$ is the radius.

5. The method of claim 4 wherein said new x, y and xy deviation indices are determined by adding said known deviation index and, respectively, $(2X_n+1)$, $(-2Y_n+1)$, and $(2X_n - 2Y_n + 2)$.

6. A system for distributing interpolation pulses to the perpendicular X and Y axes of a numerical control system to realize motion at approximately a commanded feedrate and by a series of incremental moves that approximate a straight line comprising:

means, comprised of a central microcomputer into which a part program is read, for supplying input pulses to an interpolation unit at a rate proportional to the commanded feedrate, said input pulses having move instruction data including the starting and end point coordinates of said straight line;

said interpolation unit generating an output interpolation pulse for each input pulse and comprising first, second and third adders that sum a deviation index for each preceding incremental move with said end point coordinates to respectively produce a new x deviation index which assumes only the X axis is incremented one unit, a new y deviation index which assumes only the Y axis is incremented one unit, and a new xy deviation index which assumes both axes are incremented one unit, where said deviation index is a function of an invariant parameter of said straight line, the slope, and is held as close to zero as possible;

means for comparing said new deviation indices and selecting the index with the smallest numerical value, and for generating an X axis interpolation pulse when the new x index is smallest, a Y axis interpolation pulse when the new y index is smallest, or an interpolation pulse on both the X and Y axes when the new xy index is smallest; and a control multiplexer connected to the outputs of said adders and comparing means to gate the smallest index to said adders which is the deviation index for the next incremental move in the series.

7. The system of claim 6 and further comprising accumulator means for keeping a running total of $(\sqrt{2}-1)$ every time both axes are simultaneously incremented and the commanded feedrate is exceeded, subtracting 1 whenever the total is greater than 1, and generating a command sent to said central microcomputer to skip one input pulse to make a feedrate correction.

8. A system for distributing interpolation pulses to the perpendicular X and Y axes of a numerical control system to realize motion at approximately a commanded feedrate and by a series of incremental moves that approximate a circular arc comprising:

means, comprised of a central microcomputer into which a part program is read, for supplying input pulses to an interpolation unit at a rate proportional to the commanded feedrate, said input pulses having move instruction data including the starting and end point coordinates, and coordinates of the center of said circular arc;

said interpolation unit generating an output interpolation pulse for each input pulse and comprising means for calculating the sums $(2X+1)$, $(-2Y+1)$, and $(2X-2Y+2)$, where X and Y are the coordinates of a preceding incremental move;

first, second and third adders that add a deviation index for each preceding incremental move with said respective sums to produce a new x deviation index which assumes only the X axis is incremented, a new y deviation index which assumes only the Y axis is incremented, and a new xy deviation index which assumes both axes are simultaneously incremented, where said deviation index is a function of an invariant parameter of the circular arc, the radius, and is kept as close to zero as possible;

means for comparing said new deviation indices and selecting the index with the smallest numerical value, and for generating an X axis interpolation pulse when the new x index is smallest, a Y axis interpolation pulse when the new y index is smallest, or an interpolation pulse on both the X and Y axes when the new xy index is smallest; and a control multiplexer connected to the outputs of said adders and comparing means to gate the smallest index to said adders which is the deviation index for the next incremental move in the series.

9. The system of claim 8 and further comprising accumulator means for keeping a running total of $(\sqrt{2}-1)$ every time both axes are simultaneously incremented and the commanded feedrate is exceeded, subtracting 1 whenever the total is greater than 1, and generating a command sent to said central microcomputer to skip one input pulse to make a feedrate correction.

* * * * *